United States Patent Office 3,552,755
Patented Jan. 5, 1971

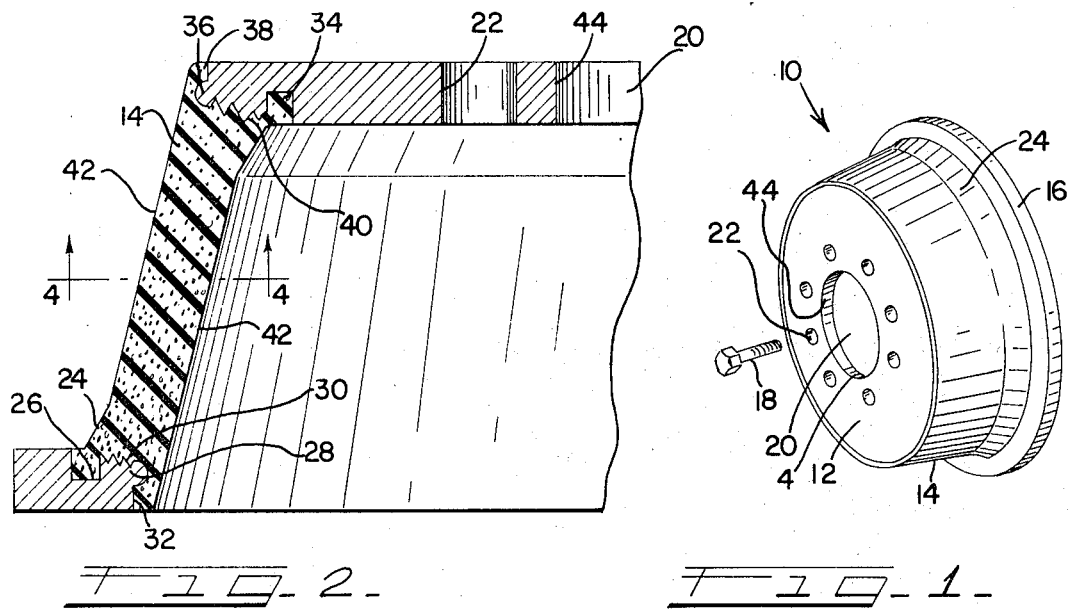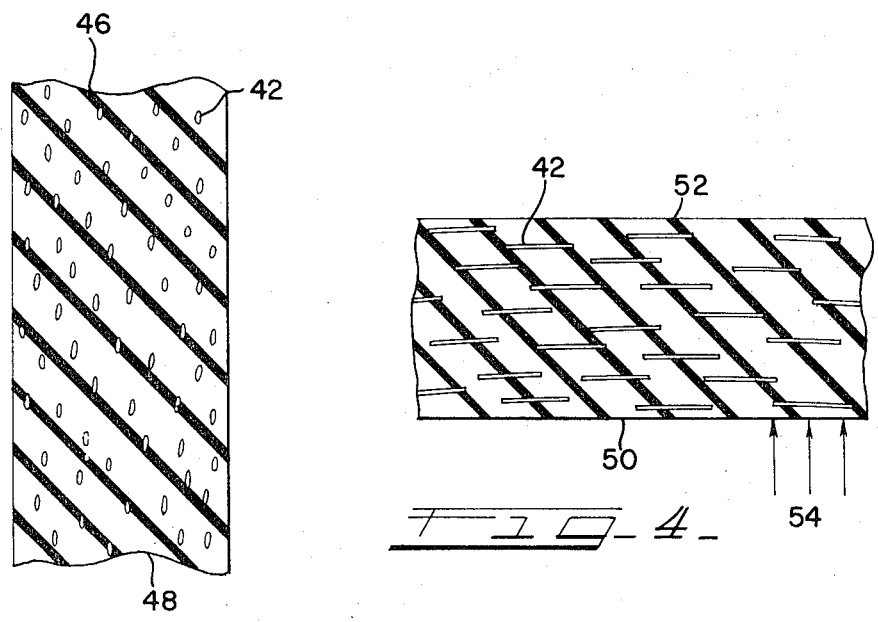

3,552,755
DIRECTIONALLY REINFORCED RUBBER AND SEAL UNIT MADE THEREFROM
Jimmie D. Leonard, Crystal Lake, Ill., assignor to Chicago Rawhide Manufacturing Company, Elgin, Ill., a corporation of Illinois
Filed Feb. 26, 1968, Ser. No. 708,343
Int. Cl. F16j 15/16
U.S. Cl. 277—212                               5 Claims

ABSTRACT OF THE DISCLOSURE

A reinforced rubber sheet material in which a plurality of long fluorocarbon polymer strands made of fine individual fibers are disposed in a generally parallel orientation in respect to a given axis of said rubber sheet. The rubber totally surrounds or encapsulates the fluorocarbon polymer strands, without necessarily being chemically bonded to such strands.

The rubber sheet material is made by adding a particulate fluorocarbon polymer to an uncured rubber composition and subjecting the mass to a series of milling, shearing, or rolling operations to create fibers from the polymer, to cause the fibers to associate into strands, and to orient the strands in relation to one axis of the rubber sheet.

In a torsional deflection seal constructed from a rubber sheet material prepared according to the present invention, the fibers have the effect of leaving substantially unaltered the shear modulus of the material along one axis, and at the same time adding substantial tensile strength along another axis, so that a resulting seal member may readily undergo torsional deflection but resist undue deflection or radial "ballooning" when subjected to an internal gas or like fluid pressure.

BACKGROUND OF THE INVENTION

Generally, the field of the present invention is that of rubber products, rubber materials, and methods of making such materials and products. More particularly, the field is that of specially prepared rubber materials which have novel characteristics which make the materials desirable for a number of uses. Rubber sheet materials according to the present invention are characterized by having differing moduli of elasticity along different axes.

Such materials are advantageously used where it is desired that a product made therefrom exhibit different properties in shear than in, or exhibit different axial and radial moduli of elasticity. Specifically, the field of the invention is that of rubber sheet materials reinforced by strands of a synthetic material, in which the strands are disposed generally parallel to a given axes, and wherein each strand comprises a large number of very fine, closely associated or intertwined fibers.

In another aspect, the field of the invention is that of a method of manufacturing such a reinforced sheet material, namely a method of mixing the ingredients and treating the composite mass so as simultaneously, while treating the rubber for milling or blending purposes, to treat the polymeric particulate material placed therein so as to cause it to form fibers, allow the fibers to become intertwined, and thereafter to assume and maintain a particular orientation in relation to the rubber material.

In a further aspect, the field of the invention is that of exclusion seal products, particularly those seals of the torsional deflection type. At present, there is a demand for a seal element which is very flexible in shear around the circumference of the seal in order to allow deflection thereof with a minimum of resistance, and which is also able to resist undue radial deflection when subjected to fluid or centrifugal forces.

Thus, the field of the invention is that of novel reinforced rubber sheet materials, methods for making such materials, and particular products made from such materials.

FIELD OF THE INVENTION

Description of the prior art

It is well known in the prior art that rubber sheet material, such as that used for drive shaft joints, couplings, seals, and in other applications where various combinations of properties are required, should exhibit high flexibility along one axis and great tensile strength along another axis. Thus, in the case of many seal units where strength is desired to be added along one axis, fibers have been incorporated into a rubber composition. For example, in machinery joints, cotton fibers of relatively short lengths have often been surrounded by rubber strongly bonded thereto, to reinforce the strength of the joint, and, at the same time, to allow a certain flexibility thereof.

Likewise, the prior art is replete with examples of directionally reinforced rubber in the field of pneumatic tires, for example, where strands of fibers are connected together to form the outline of the carcass or body of tire, and the structure thus formed is completed by surrounding the strands with a strongly adherent rubber material cast or molded thereover. In such cases, the cord material has been cotton, any of a number of synthetic fibers, and more recently, even metal wire or fiberglass. A structure resulting from such construction has great tensile strength in a direction or along an axis perpendicular to the orientation of the reinforcing fibers, and yet is somewhat flexible in compression along the long axes of such fibers. In many other particular applications, the advantages of reinforcing fibers used in this manner are well known.

However, in the field of rubber seals in which the material is called upon to undergo shear, or torsional deflection, as for example, in a movable part oscillating back and forth through an angle of rotation in relation to a fixed part, the problems of reinforcing are somewhat different. In these areas, the prior art has included, for example, attempts to place relatively short cotton fibers in a seal member.

Other attempts have been made to add strength by the addition of chemical additives, such as carbon black or the like.

In addition, other constructions have been proposed to minimize outward deflection of a seal comprising a solid or surface of revolution, generally of a cylindrical or frustoconical shape, and still allow shear thereof, but these attempts have generally involved winding extremely long strands of reinforcing material about the seal body in a particular pattern. Such methods are not practical for use in a seal unit which is designed to be produced at low cost.

In particular, the prior art has been presented with a problem of reliable and economical manufacture of a torsional deflection seal, for example, a frustoconical seal element connecting a helicopter blade to a driving hub unit. In keeping with present day rotary wing aircraft practices, a helicopter blade moves in three different modes in relation to the hub. Considering for the sake of example that the drive shaft rotates about a vertical axis, the blade itself, in order to propel the helicopter forward, must change its angle of attack or pitch during revolution around the vertical axis. Thus, a helicopter blade undergoing cyclic pitch change moves from a positive or initial angle of attack, through a negative or reduced angle of attack, and back to the initial or positive angle of attack, for each revolution of the blade. In addition, the amount of the angle of attack is collectively varied in order to raise and lower the altitude of the helicopter aircraft. In addition, the blades of the helicopter progress through varying angles in relation to horizontal when rotation speed is changed, lift of the blades changes, and then the aircraft is started and stopped. Further, the blade undergoes a variation known as "lead-lag variation" as it progresses around in a circle through each revolution, as a result of shock stresses generated by the reversal of pitch and differing resistance of movement through the air during different portions of the cycle.

In view of these conditions, a helicopter seal must undergo torsional deflection and a certain amount of bending in order to be satisfactory in use. It is common today for helicopter blades to rotate at speeds up to or exceeding 200 revolutions per minute, and accordingly, if great internal resistance to shear is present in the seal, excessive heat will develop in the seal member, and useful life thereof will be shortened. Accordingly, it is desired to keep the resistance to shear or torsional deflection to a minimum.

Another problem in relation to helicopter seals is that it is a common practice today, in order to detect potential failures of helicopter blades, to fill the hollow interiors of the blades with a gas, ordinarily at a pressure of about 5 to 10 pounds per square inch. The purpose of this gas is to provide an indication that the blade structure is airtight. In the event that fine, almost invisible cracks develop in the helicopter blade, the gas contained therein will leak outwardly from the blade, and the loss of gas pressure is displayed on a warning device so it may be detected by the pilot or a maintenance crew member. In this way, replacement of the blade may be made before it fails in use. Since this pneumatic pressure does not exist only in the blade itself, but also radially inwardly thereof namely, in the hub area, the torsional deflection seals covering the hub-to-blade-joint must also resist gas pressure, as well as the ordinary pressures created by centrifugal force.

Thus, in the prior art, helicopter blade seals which had a sufficiently low modulus of elasticity for reasonable longevity in use by reason of moderate heat generation were so soft that the internal pressure in the blade system caused them to balloon outwardly. Such conditions, in view of available space, were not permissible or satisfactory.

The combination of all these factors has been to create a need for a material which can be incorporated into a torsional deflection helicopter blade seal, and which would then maintain a low modulus of elasticity along one axis, and yet provide greatly increased tensile strength along another axis, and to do so at a reasonable cost and under conditions which are conducive to manufacture using known techniques. Other problems of the prior art in other fields have also created a demand for a directionally reinforced rubber of the type provided by the present invention, but since these problems are basically of a similar nature, they will not be treated further herein.

SUMMARY OF THE INVENTION

In view of the shortcomings of the prior art, and the inability of workers in this art to produce a satisfactory rubber sheet material having the characteristics referred to above, it is an object of the present invention to provide a directionally reinforced rubber sheet material containing a plurality of strands of reinforcing material, generally oriented along a particular axis, and comprised of a plurality of polymeric fluorocarbon fibers.

A further object of the invention is to provide a rubber sheet material construction in which a plurality of strands comprised of fine fluorocarbon polymer fibers are encapsulated or held within a rubber material which surrounds the strands, but it is not chemically bonded to them.

Another object of the invention is to provide a reinforced rubber sheet material in which crack propagation is greatly diminished by reason of eliminating the stress concentrations which are created by a crack or fissure when such crack or fissure reaches a region where the reinforcing strand is present.

A still further object of the invention is to provide a torsional deflection seal unit which is of a generally frusto-conical form, having a relatively high tensile strength, in a radial direction, and which allows a low modulus of elasticity in shear, measured around the circumference of such seal unit.

A further object of the invention is to provide a method of manufacturing a directionally reinforced rubber sheet material wherein reinforcing material may be introduced in a particulate state into a rubber mass, reduced to fibers which then become associated or intertwined to form strands having a particular orientation in relation to one axis of the sheet material.

These objects, and other objects of the invention are achieved by providing a rubber sheet material having a longitudinal axis and two other axes transverse thereto, and wherein the composition contains reinforcing strands, the major portion of which are oriented parallel to said longitudinal axis, and in which each of the strands is made up of a large number closely associated, individual fibers of resinous fluorocarbon polymeric material. The invention accomplishes other of its objects by providing a method of adding a particulate polymeric material to a rubber material, and treating mass so as to form fibers in the rubber, to associate the fibers into strands, to orient the strands along a given axis, and to form the sheet material made by such a process into a desired article of manufacture.

The manner in which the invention achieves these objects and others which are inherent therein, will become more apparent when considered in conjunction with a description of the preferred embodiments of the invention, and as shown in the drawings, in which like reference characters denote corresponding parts throughout.

BRIEF DESCRIPTION OF THE DRAWINGS

FIG. 1 is a perspective view of a torsional deflection seal assembly in which the seal element is made with the novel sheet material of the present invention.

FIG. 2 is a vertical sectional view, with portions broken away, on an enlarged scale, showing the construction of a seal unit made with the novel material.

FIG. 3 is a further enlarged vertical sectional view of the novel sheet material of the invention.

FIG. 4 is a horizontal sectional view, taken along lines 4—4 of FIG. 2, showing somewhat diagrammatically the alignment of the reinforcing strands in the novel sheet material of the invention.

The various steps in constructing a torsional deflection seal according to the present invention will now be discussed. These steps include the selection of the proper materials, blending the materials according to the invention, forming a rubber sheet material having the desired characteristics, and using the material to form the sealing element of a torsional deflection seal assembly.

Material selection

The rubber preferred for use in the invention is of a type well known in the torsional deflection seal art, namely a nitrile rubber composition, which, when cured, will yield a seal material of the desired Durometer reading, and possess other desirable qualities which are well known in this art. Since the addition of the reinforcing strands does not, except in the minor particulars set forth below, alter the composition of the rubber component of the material, the exact selection of the rubber type and composition does not form a necessary part of the present invention, and further detailed description thereof is omitted.

In addition to the rubber material itself, curing agents, such as sulfur or sulfur-containing compositions, are also used, as are other conventional additives for known purposes, such as carbon black for added tensile strength, anti-oxidants of various types, tougheners, and, in some cases, plasticizers.

Next, the fluorocarbon polymer is selected. In keeping with the invention, a polytetrafluoroethylene material is used, for example, polytetrafluoroethylene sold by the Du Pont Company under the trademark "Teflon." This material comes in two grades or classes, classified according to intended use as a molding grade, or an extrusion grade. With the present invention, an extrusion grade should be used. This material is characterized as having a high reduction ratio, that is, of the order of from between about 10 to 30 to 1 up to about 5000 to 1 or more. Such material is one which readily forms fibers under the conditions characterizing the process of the present invention. Typical grades of this material are known as "Teflon-6," "Teflon-6C," and "TE 3194."

These materials, when subjected to slight shear, of the order of that generated in the process further described herein, will smear out and form very fine, delicate fibers, having extreme lengths in relation to their diameters. It is preferred that the fluorocarbon material be supplied in a powder form having a particle size of 1 to 5 microns, with the major portion thereof having a particle size of about 2 microns.

In order to facilitate the extrusion or smearing of the particles into fibers, and to prevent undue agglomeration of the particles, a plasticizer is added to the "Teflon" powder in an amount sufficient to wet the surface of the powder, upon thorough tumble mixing, for example, of thirty minutes or more. A typical plasticizer is a high molecular weight ester, such as dibutyl phthalate. Since the plasticizer does not harm the rubber, but does soften it somewhat, additional carbon black may be added to the rubber mix to offset the addition of the plasticizer. This is the only manner in which the presence of the fluorocarbon polymer actually affects the chemical characteristics or composition of the rubber.

Although, as pointed out above, the selection of materials does not necessarily form a part of the present invention, it has been found to be preferable, in selecting the desired grade of fluorocarbon, that if the rubber component is a relatively softer product, that is, if the rubber component has a low Durometer reading, the fluorocarbon should have a lower reduction ratio. In other words, since the shearing action which causes fiber formation is imparted to the entrapped fluorocarbon particles by the rubber phase of the composition, a softer rubber will not be able to form fibers in a "Teflon" that is hard to shear into fibers, and thus, the shear-imparting characteristics of the rubber should be balanced with the shearing requirements of the fluorocarbon polymer.

Mixing ingredients and forming sheet materials

After the materials have been selected according to the criteria set forth above, the materials are treated as described below.

The fluorocarbon polymer is passed through a No. 12 screen at a temperature preferably below 68° F., and sufficient plasticizer is added to the powder to wet the outside surfaces thereof. The powder is then tumble mixed for 30 minutes.

Next, the rubber and the particulate fluorocarbon polymer were placed, in the ratio of about 2% up to about 5 to 10% by volume, in a Banbury mixer, for dispersing the particles throughout the rubber, and for breaking down the agglomerates of particles into a somewhat smaller size. For example, the powder may have agglomerated to a particle size of about 400 microns, and the Banbury mixer breaks these particles up to perhaps 40 microns in size. These agglomerates, however, are not chemically combined, nor strongly bound together physically. The Banbury mixer accomplishes some shearing of the mix and disperses the fluorocarbon particles in the mix.

The next step is subjecting the batch to a shearing operation on a mill comprising two equal diameter metal rollers having peripheral velocities which differ in the ration 1.3 to 1. This step accomplishes additional shear on the mix, and causes the particles of fluorocarbon to be sheared or extruded into fine fibers or threads. Since these particles are typically present in the form of agglomerates of particles, each particle tends to form a single fiber or thread, but many threads or fibers are formed at the same time in closely adjoining regions of the mix. The result is that strands composed of many fibers are formed; formation of fibers therefrom while the particles are in close proximity to each other causes the fibers thus formed to become intertwined or otherwise closely associated with one another. Each large particle or group of particles may thus form a plurality of fibers or threads of reinforcing material.

After the step described above, rubber material thus formed was run through so-called refiner rollers, that is, rollers having a nip or separation of about 0.010 inch and relative peripheral speeds differing from each other by an order of about 6 to 1. This operation serves to place considerable additional shear on the material, and thus to elongate the composite strands and individual fibers previously formed into reinforcing strands of considerable length. Typically, the product emerging from the refiner contains strands of up to one-half inch in length, comprised of a very large number of intertwined, closely associated individual fibers.

The next step is to form sheets of a desired thickness from the novel material by running the sheets emerging from the mill through calender rollers operating at the same speeds. This operation creates sheets in which the strands are generally oriented in a parallel manner, namely longitudinally of the direction of travel through the calender rollers. The fibers are thus linearly disposed in general, parallel to each other and to top and bottom surfaces of a sheet of material. If sheet material having this orientation is desired to be made the sheet material is cured, say at 350° F., until a cured rubber material results. The fibers retain their orientation during curing.

Forming a seal element

The direction of the movement of the rubber sheet material through the calender is noted, and, in keeping with the design and dimensions of a desired style of seal element, the sheet material is cut to the desired width and length.

Thereupon, the sheets of material are placed in a generally circular mold, the cavity therein defining a solid of revolution, for example, and the sheet material containing the oriented fibers is placed in the mold with the fibers having their long axes extending in the direction of the circumference of the mold. The mold is closed and heated to 350°, to cure the rubber composition. Since fluorocarbon polymers do not cure into relatively stiff or brittle solids at temperatures substantially below 600° to 700° F., the strands dispersed in the rubber, and the fibers comprising the strands retain a degree of elasticity and remain relatively pliable while the rubber is cured until it attains desired properties.

Referring now to the drawings in greater detail, a torsional deflection seal assembly utilizing a seal element made from the rubber composition of the present invention is shown. FIG. 1 shows the seal assembly 10 of the invention to comprise generally an outer, metal flange member 12, a directionally reinforced rubber torsional deflection sealing element body 14, an inner flange member 16, and a typical fastener 18.

A central opening 20 is provided to accommodate a shaft or like member, and the fastener in the form of a cap screw 18 extends through an opening 22, which is one of an array of similar openings forming a bolt circle concentric with the opening 20. In the embodiment shown in FIG. 1, the seal element body 14 has a tapered outer surface 24 adjacent the flange 16.

Referring now to FIG. 2, the construction features of the seal unit are shown in greater detail. Thus, the inner flange 16 is shown to include a groove 26 which is generally rectangular in cross section, and a land 28 which extends circumferentially around the radially inner edge of the flange 16, and which in turn includes a plurality of serrations 30 on the top thereof. Additionally, an axially extending adhesive surface 32 is provided and is disposed axially inwardly of the land 28.

The outer flange 12, shown at the top in FIG. 2, is a generally reverse mirror image of the inner flange 16, that is, it contains a groove 34 of generally rectangular cross section, a radially outwardly directed land, and axially extending surface 38, and a plurality of serrations or teeth 40 connecting the land 36 to the groove 34.

A directionally reinforced rubber seal member body 14 extending between the two flanges 12, 16 comprises a rubber body portion 14 and a very large plurality of reinforcing strands 42 therein. The strands 42 are shown in end section in FIG. 2, indicating that they are generally disposed with the longitudinal axes thereof generally extending around the body 14 of the seal assembly 10.

By reference to FIGS. 1 and 2, it may be seen that the flange 16 typically remains rotationally stationary relative to a fixed machine part such as a drive hub, and that the flange 12 oscillates through an angle of rotation about an axis defined by and parallel to the sidewalls 44 of the principal opening 20 in the seal assembly 10. In addition, in operation, the fibers, 12, 16 undergo a certain amount of tilting in respect to each other, that is, the "lead-lag" motion, as well as the "flap" or collective pitch motion, causes a certain amount of skewing of the two flanges 12, 16, so that the two do not remain parallel to each other at all times.

Referring now to FIGS. 3 and 4, the orientation of the macro or relatively large reinforcing strands 42, in relation to the rubber material comprising the body 14 of the seal element is shown. These figures somewhat diagrammatically illustrate the fact that most of these strands 42 are relatively long in relation to their cross section, and that, with respect to FIGS. 1 and 2, for example, the strands 42 have the long axes thereof generally following the curvilinear extent of the seal body member 14 in a parallel orientation with respect to the circumferential surfaces thereof. Thus, with particular reference to FIG. 3, it will be seen that fibers disposed as shown therein will, according to known structural principles, have little, if any effect on the shear characteristics of the rubber as it is deflected in shear parallel to the top surface 46 and the bottom surface 48, in the orientation shown in FIG. 3.

Referring now to FIG. 4, it will be seen that shear parallel to a radially inner face 50 and a radially outer face 52 is not greatly affected by the presence of the strand 42, because of the orientation thereof. However, these strands serve to add considerable tensile strength, and accordingly, resistance, to a force applied in the direction indicated by the arrows 54, since such a force, in order to deflect the rubber outwardly, would have to move the entire length of the strands through the rubber material.

Referring to FIGS. 2 through 4, it should be borne in mind that the strands 42 shown therein are somewhat diagrammatically represented, and are not necessarily shown to an actual scale. It will be further appreciated that, as pointed out above, and as set forth in the appended claims, the strands themselves are made up of hundreds or thousands of extremely thin fibers, which when intertwined or otherwise closely associated, make up or comprise one typical strand such as those shown in the drawings.

Alternate constructions

The example set forth above relates to making a seal unit with a directionally reinforced nitrile rubber material. However, other rubber materials may be used with the fluorocarbon reinforcing strands used in the present invention. As pointed out above, when selecting the materials for use with the invention, and particularly the fluorocarbon polymer, it is desired to match the shear or extrusion characteristics of the fiber or thread forming component with the amount of shear which is required to be placed on the rubber material, as well as the amount of shear which the rubber material is able to impart to the fluorocarbon polymer. Thus, the above described embodiment has reference to mixing a nitrile rubber, wherein the steps of mixing, shearing, refining, and calendering are somewhat conventional for that type of rubber. Substantially the same steps are used when other natural or synthetic rubbers, generally of a hydrocarbon type, are used. Those skilled in the art are familiar with blending, forming, and curing such rubber materials in substantially the manner set forth above.

The concept of providing directionally oriented, reinforcing fluorocarbon polymer fibers and strands in a rubber material is not limited to use with a hydrocarbon rubber, however. The method of the present invention may also be practiced to produce a silicone rubber sheet material, substituting a silicone rubber material for a nitrile or other rubber, according to the present invention. In such a case, the silicone rubber does not ordinarily need the same degree of milling and shearing which is required for a hydrocarbon rubber, and accordingly, the reinforcing fluorocarbon material is selected so as to be able to be dispersed in such silicone rubber, and at the same time, to be formed into fibers on the application of an appropriate shearing force to the rubber mass. A satisfactory product may also be produced in this manner, provided that the curing temperature applied to the silicone rubber does not closely approach the curing temperature of the fluorocarbon polymer. Hence, unless otherwise stated, the expression "rubber," as used herein, and in the claims, embraces natural and synthetic rubbers, and hydrocarbon and silicone rubber materials, unless otherwise expressly limited.

By "hydrocarbon rubber" is intended to be meant natural rubbers, isoprene rubbers, butadiene-styrene rubbers, butadiene-acrylonitrile rubbers, uethane rubbers, and like elastomeric compositions.

When subjected to life tests, a helicopter blade seal unit made in accordance with the present invention, using the directionally reinforced rubber material described herein, showed a greatly lengthened useful life, and outstanding resistance to fatigue cracks, etc. A typical sample demonstrated the ability to withstand well over 10 million cycles without failure, whereas a rubber seal of the same material, but without the reinforcing strands, failed at a much earlier point.

Although the reasons for the success of the invention are not known with certainty, it is believed that the encapsulation of the fibers without bonding thereof to the rubber material is helpful insofar as relieving stress concentrations which arise when a crack is being propagated transversely through the material, and reaches an "envelope" surrounding a reinforcing fiber. Such cracks will not readily be initiated thereafter, since the stress is in shear. Thus, a severely fatigued seal element may have many fine, short cracks therein, but the element maintains the overall structural integrity and gas tight sealing characteristics in spite of such cracks. Prior art seals fail almost at once after the first appearance of such structural cracks.

It will thus be seen, from the foregoing description, that the present invention provides a novel sheet material, method of making the same, and seal element made therefrom, said material, method and element having many novel advantages and characteristics, including those which are inherent in the invention. Having com-

I claim:

1. A sealing element for a torsional deflection seal assembly, said element comprising a body in the form of a solid of revolution with an axially extending central opening therein, said body being defined by radially inner and radially outer surfaces of revolution, said body being made from a rubber material which includes a plurality of reinforcing strands encapsulated within a plurality of individual envelopes in said material, said strands being substantially free of chemical bond to said material, the major portion of said strands being disposed with the lengths thereof extending generally parallel to said surfaces of revolution and extending circumferentially of said body, each of said strands comprising a large plurality of polymeric fluorocarbon fibers closely associated with one another.

2. A sealing element as defined in claim 1, in which said rubber is nitrile rubber.

3. A sealing element as defined in claim 1 in which said rubber is a silicone rubber.

4. A torsional deflection seal assembly comprising first flange means adapted to be received by a first machine member, second flange means adapted to be received by a second machine member adapted to undergo rotationally oscillating motion relative to the axis of said first machine member, and hollow sealing element means in generally sleeve-like form, fixedly attached to each of said flanges, said sealing element means being of a rubber material and having therein a plurality of reinforcing strands, substantially all of said strands being encapsulated within a plurality of individual envelopes within said material, said strands being substantially free of chemical bonding to said material, each of said strands comprising a large plurality of polymeric fluorocarbon fibers closely associated with each other, said strands having the lengths thereof disposed generally parallel to the circumferential extent of said sleeve-like sealing element means.

5. A torsional deflection seal as defined in claim 4 in which said sleeve-like sealing element means is in the form of a generally frusto-conical member, and in which each of said flanges is generally circular and has an opening centrally disposed therein.

References Cited

UNITED STATES PATENTS

| | | | |
|---|---|---|---|
| 2,835,329 | 5/1958 | True | 277—227X |
| 2,892,650 | 6/1959 | Runton | 277—227 |
| 2,971,787 | 2/1961 | Lincoln | 277—212FBUX |
| 3,341,259 | 9/1967 | Schulz et al. | 277—92X |

FOREIGN PATENTS

| | | | |
|---|---|---|---|
| 1,249,033 | 8/1967 | Germany | 277—92 |

LAVERNE D. GEIGER, Primary Examiner

J. S. MEDNICK, Assistant Examiner

U.S. Cl. X.R.

277—235, 237; 161—144